United States Patent
Amo et al.

[19]

[11] Patent Number: 5,954,908

[45] Date of Patent: *Sep. 21, 1999

[54] DEVELOPING STORAGE DISC BOSS

[75] Inventors: Mikuni Amo; Masami Inouchi, both of Tokushima-ken, Japan

[73] Assignee: Kitano Engineering Co., Ltd., Tokushima, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,338

[22] Filed: Oct. 15, 1996

[30] Foreign Application Priority Data

Oct. 13, 1995 [JP] Japan .................................. 7-291778

[51] Int. Cl.⁶ ................................................. B32B 31/00
[52] U.S. Cl. ......................... 156/285; 156/74; 156/295; 118/52; 118/56; 118/500; 427/240; 427/296; 269/21; 269/47; 269/52
[58] Field of Search ................................ 269/21, 47, 52; 156/285, 286, 295, 74, 556, 379.8; 118/52.55, 56.5; 427/240, 296

[56] References Cited

U.S. PATENT DOCUMENTS

| | | | |
|---|---|---|---|
| 1,198,402 | 9/1916 | Bagnall ..................................... | 269/21 |
| 2,575,631 | 11/1951 | Link ......................................... | 269/21 |
| 2,680,994 | 6/1954 | Wood ....................................... | 269/21 |
| 4,877,475 | 10/1989 | Uchida et al. ........................ | 156/273.7 |
| 4,995,799 | 2/1991 | Hayashi et al. ........................ | 425/111 |
| 5,421,595 | 6/1995 | Cripe et al. .............................. | 269/21 |
| 5,681,634 | 10/1997 | Miyamoto et al. ................... | 428/64.6 |
| 5,744,193 | 4/1998 | Kitano .................................... | 427/162 |
| 5,800,670 | 9/1998 | Kitano .................................... | 156/578 |
| 5,843,257 | 12/1998 | Inouchi .................................... | 156/74 |

FOREIGN PATENT DOCUMENTS

| | | |
|---|---|---|
| 61-126648 | 6/1986 | Japan . |
| 61-139956 | 6/1986 | Japan . |
| 1101124 | 4/1989 | Japan . |
| 4-53012 | 8/1992 | Japan . |
| 8036786 | 2/1996 | Japan . |

Primary Examiner—David A. Simmons
Assistant Examiner—Linda L Gray
Attorney, Agent, or Firm—Flynn, Thiel, Boutell & Tanis, P.C.

[57] ABSTRACT

A developing storage disc boss adapted to engage a recess in a rotatable holding table for developing a storage disc including two discoid resin substrates with adhesive contained in a space therebetween. The developing storage disc boss includes a barrel portion for the engagement and a suction cylindrical portion that extends upwardly and orthogonally from a top planar wall of the barrel portion. There is a suction passage extending axially along the boss which includes first and second passages. There are a plurality of suction holes around the periphery of the suction cylindrical portion which communicate with the space between the two substrates. The holes extend radially through the suction cylindrical portion and have inner ends that open directly into the first passage. The first passage opens directly into the second passage, and the diameter of the second passage is greater than that of the first passage.

8 Claims, 5 Drawing Sheets

DEVELOPING STORAGE DISC BOSS

BACKGROUND OF THE INVENTION

1. Field of the Invention

The present invention relates to a rotation holding table for rotating and holding a storage disc thereon and a boss thereof.

2. Prior Art

Computers, especially personal computers have become remarkably widespread recently, and a storage media to be used thereby, particularly, the capacity of a storage disc has been high and the kinds of the storage media are increased. There are a magnetic disc, an optical disc (e.g., CD-ROM), an optical magnetic disc (e.g., MO) as the storage disc. The use of the optical disc as the storage disc has increased recently.

Figure 6:
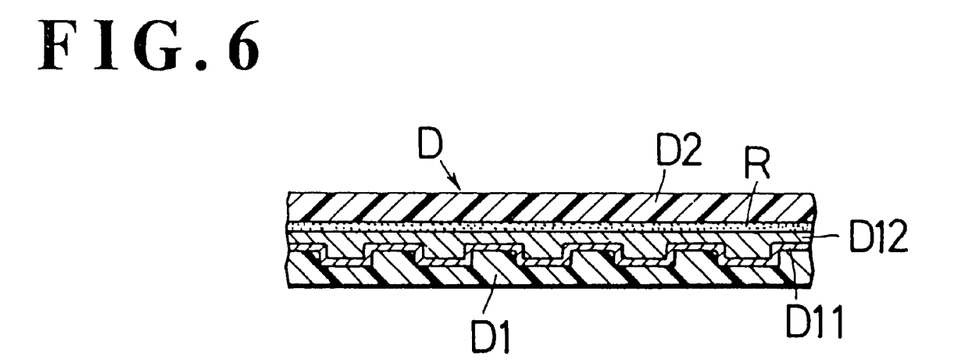
FIG. 6 is a cross sectional schematic view of an storage disc.

Exemplifying an optical disc called a DVD, a discoid resin substrate that is a single plate constituting the DVD is required to have a thickness of 0.6 mm and an outer diameter of 120 mm and an inner diameter of its central hole of 15 mm. If such a discoid resin substrate is formed of a single discoid resin substrate, it is low in mechanical strength and is easily deformable. Accordingly, discoid resin substrates, each having the same thickness (0.6 mm) are bonded to each other. For example, FIG. 6 schematically shows a DVD of an optical disc formed of two discoid resin substrates (a first discoid resin substrate D1 and second discoid resin substrate D2) which are bonded to each other.

The first discoid resin substrate D1 is formed by a transparent polycarbonate resin by e.g., an injection molding machine. Irregular signal pits (signal holes) serving as information signals, such as sound, are transferred to one surface of the first discoid resin substrate D1. A reflection reducing coating D11 (e.g., aluminum film, etc.) is formed on the signal pits, and a protective coating D12 is formed on the reflection reducing coating D11 to prevent the signal surface from being damaged.

The second discoid resin substrate D2 is formed of the transparent polycarbonate resin, etc. which is the same as the first discoid resin substrate D1 and is bonded onto the first discoid resin substrate D1, in which the signals or information is stored, by way of an adhesive R.

The second discoid resin substrate D2 may be directly bonded onto the first discoid resin substrate D1 by way of the adhesive R without forming the protective coating D12 on the first discoid resin substrate D1.

The optical disc D formed by bonding the first and second discoid resin substrates D1 and D2 receives light reflected on the reflection reducing coating D11 a laser beam by a light detector, not shown, to thereby reproduce the signal.

It is needless to say that the optical disc D called the DVD, can employ a second discoid resin substrate D2 in which signals or information is stored.

Since the high density storage disc including the DVD typically does not use the single substrate or plate and frequently uses plural substrates or plates, the first discoid resin substrate D1 and the second discoid resin substrate D2 need to be bonded to each other.

Figure 7:
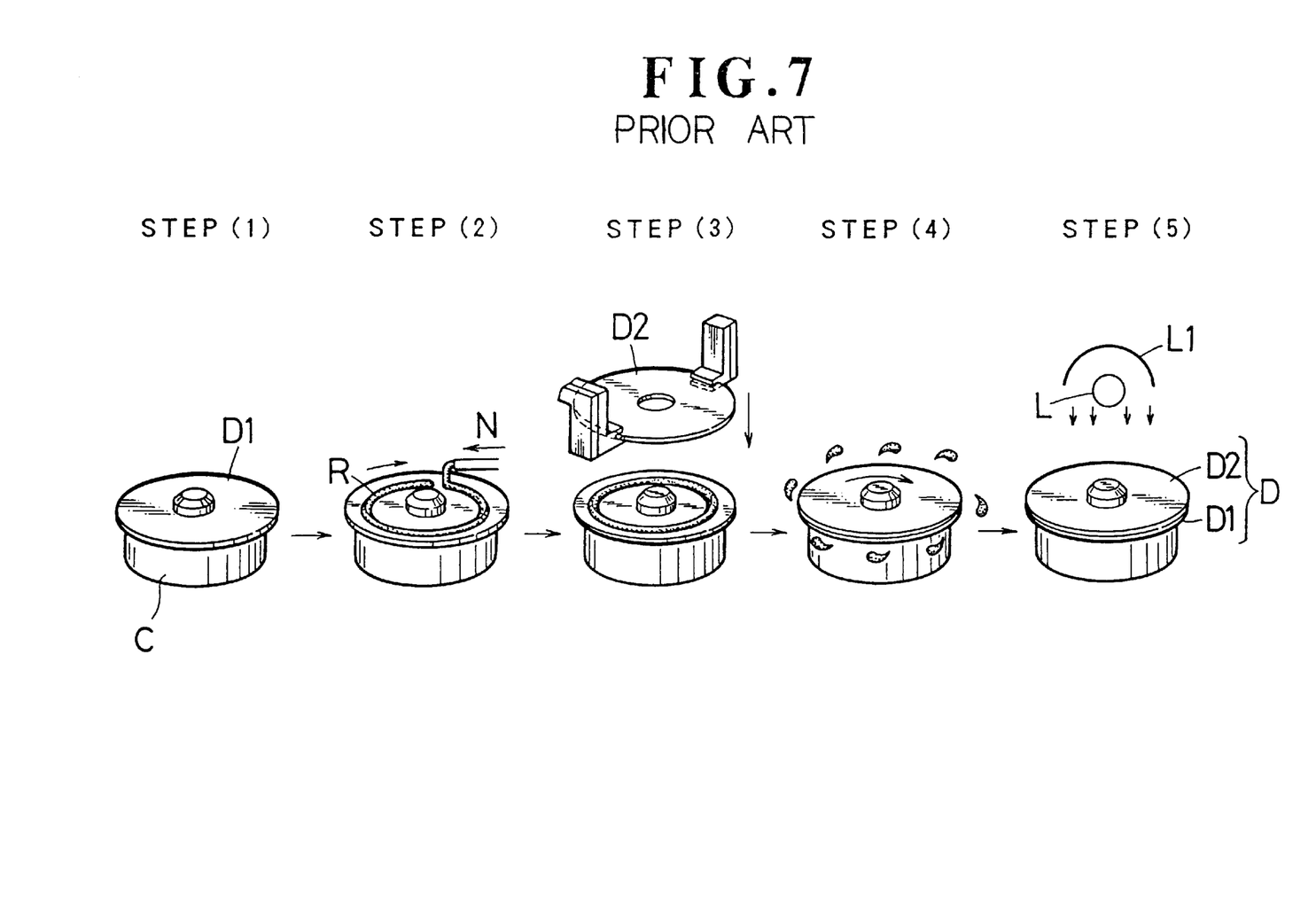
FIG. 7 is a schematic processing view showing general processes for manufacturing a storage disc by bonding a second discoid resin substrate onto a first discoid resin substrate by way of an adhesive.

A series of steps are performed to form an integrated optical disc (i.e., an optical disc) by bonding each single plate (see FIG. 7).

(1) a step of placing the first discoid resin substrate D1 on a placing table C.

(2) a step of coating the adhesive R onto the first discoid resin substrate D1.

(3) a step of placing the second discoid resin substrate D2 on the first discoid resin substrate D1 to thereby bond the former onto the latter.

(4) a step of developing the adhesive R which is interposed between both first and second discoid resin substrates D1 and D2.

(5) a step of curing the developed adhesive R.

Briefly explaining the steps set forth above, first in the step (1), the first discoid resin substrate D1 on which the reflection coating and the protective coating are coated is uniformly subjected to a suction and held on the placing table C.

In the step (2) of coating the adhesive R, the adhesive R, e.g., an ultraviolet curing resin, is jetted from a jetting nozzle N while the placing table C on which the first discoid resin substrate D1 is placed is rotated at a low speed.

It is preferable that the adhesive is jetted in a doughnut-shaped track although tracks of the adhesive R to be jetted onto the first discoid resin substrate D1 are differentiated from one another depending on the movement of the jetting nozzle N.

In the step (3), the transparent second discoid resin substrate D2 is placed on the first discoid resin substrate D1 on which the adhesive R is coated.

In the step (4), the adhesive R interposed between the first and second discoid resin substrates D1 and D2 is developed to be uniformly extended between the first and second discoid resin substrates D1 and D2. The development of the adhesive R is performed by rotating the placing table C at a high speed (normally the speed of rotation is several thousand rpm or more for about several seconds) in a state where the first and second discoid resin substrates D1 and D2 are bonded to each other, namely, where the optical disc D is placed on the placing table C. With the rotation of the placing table C, surplus adhesive R which is present between the bonded first and second discoid resin substrates D1 and D2 is scattered outward when the adhesive R is developed, and also the air sealed between the first and second discoid resin substrates D1 and D2 (air bubbles, etc.) is discharged outward.

In the step (5), the adhesive R, e.g., ultraviolet radiation curing resin layer, is cured by being irradiated with ultraviolet radiation in a state where the bonded and integrated first and second discoid resin substrates D1 and D2 are rotated (e.g., at about several tens rpm) or not rotated.

More specifically, a ultraviolet light source L having a reflecting mirror L1 at the back surface thereof emits light, thereby effectively curing the ultraviolet curing resin layer. Meanwhile, the curing step is different depending on the kind of adhesive R to be used, and hence a curing method conforming to the characteristics of the adhesive R is employed.

As mentioned above, the steps for bonding and integrating both substrates are completed.

The developing step among the above steps is very important because the adhesive R is uniformly extended between the two substrates.

However, the adhesive R is not always uniformly developed by the development using a conventional placing table C. The reason is that the adhesive R is jetted in the doughnut-shape, and further the adhesive R is not sufficiently jetted usually until it reaches the central hole of the optical disc D in the sense that the adhesive R is ultimately effectively used.

Accordingly, in the developing step, there is a problem that the adhesive R is not sufficiently extended in the region adjacent to the central hole of the optical disc D when the adhesive R is developed outward owing to the centrifugal force, etc., and hence the optical disc D is short of the development inside thereof, whereby air remains in the optical disc D.

The inventors of the present application ascertained from testing that the adhesive R is nonuniformly scattered from the central hole toward the inside thereof to thereby contaminate the surface adjacent to the central hole of the optical disc D when the adhesive R is jetted to a part adjacent to the central hole. Considering the performance of the optical disc D, if the adhesive R is not uniformly extended to the region of the central hole, the strength of the region of the central hole is remarkably lowered or the strength of the optical disc is nonuniform as a whole when the adhesive R is cured later. In addition to that, there is not normally present a reflection coating on the central portion of the optical disc D, thereby forming a spotted pattern on the central portion, leading to an inferior beauty or spoiling the beauty of the optical disc D.

The storage disc has been diversified recently as set forth above, and there are various standards in the size thereof (dimensions, etc.), for example, there appears a kind of storage disc having an inner diameter of, e.g., 4 mm, which is different from the inner diameter of the 15 mm of the central hole of the present optical disc D.

As far as the storage disc formed of an integrated plate, which is made of two bonded and integrated discoid resin substrates, is concerned, the two substrates must be bonded to each other using the adhesive, which needs the developing step by the rotation of the storage disc.

However, in the method having the developing step which is caused by the rotation of the optical disc, it is difficult to uniformly develop the adhesive at the region adjacent to the central hole of the optical disc, leading to a deterioration in quality. Accordingly, it is a very important key point that the adhesive is thoroughly and uniformly extended to improve the quality of the optical disc. However, the decisive solution has not been proposed so far.

SUMMARY OF THE INVENTION

The present invention has solved the problems under the aforementioned background of the invention. That is, it is an object of the present invention to provide an apparatus for uniformly developing an adhesive at the region where two substrates are bonded to each other adjacent to the central hole of an optical or storage disc, namely, a table for holding and rotating the storage disc and a boss of the table.

Meanwhile, the inventors of the present application have endeavored themselves to research, and found out that the development of the adhesive is effectively enhanced at the region adjacent to the center of the storage disc when the center of the storage disc is negatively pressurized when the adhesive is developed.

The inventors completed the present invention in view of the aforementioned finding.

To achieve the above object, it is a first aspect of the invention to provide a rotation holding table for rotating and holding a storage disc thereon and developing an adhesive, wherein the storage disc is formed by two discoid resin substrates, each having a central hole therein, the adhesive is interposed between the two discoid resin substrates, the rotation holding table comprising a rotatable base table and a boss attached to the base table.

It is a second aspect of the invention to provide a rotation holding table according to the first aspect of the invention wherein the boss comprises a barrel portion which is detachably attached to the base table and a suction cylindrical portion protruding from the barrel portion.

It is a third aspect of the invention to provide a rotation holding table according to the first aspect of the invention wherein the base table comprises a table for applying suction to and fixing the storage disc and a supporting portion for supporting the table.

It is a fourth aspect of the invention to provide a rotation holding table according to the second or third aspect of the invention, wherein the suction cylindrical portion and the table are respectively connected and opened to the same negative pressure source, thereby dispensing with two different negative pressure sources.

It is a fifth aspect of the invention to provide a rotation holding table according to the second aspect of the invention further including a space which is provided between the storage disc, the boss and the base table and is opened outward in a state where the storage disc is placed on the base table.

It is a sixth aspect of the invention to provide a boss comprising a barrel portion and a suction cylindrical portion protruding from the barrel portion, wherein the suction cylindrical portion is mounted on the central hole of the storage disc.

It is a seventh aspect of the invention to provide a boss according to the sixth aspect of the invention wherein the suction cylindrical portion has a plurality of suction holes therearound.

It is an eighth aspect of the invention to provide a boss according to the sixth aspect of the invention wherein the suction holes are defined in a base portion of a ring groove provided on a periphery of the suction cylindrical portion.

It is a ninth aspect of the invention to provide a boss according to the seventh or eighth aspect of the invention wherein each suction hole has an inner diameter which is enlarged outwardly.

It is possible to effectively develop the adhesive adjacent to the central holes of the both discoid resin substrates by employment of the base table on which the storage disc is held and rotated and the boss of the base table.

PREFERRED EMBODIMENT OF THE INVENTION

Figure 1:
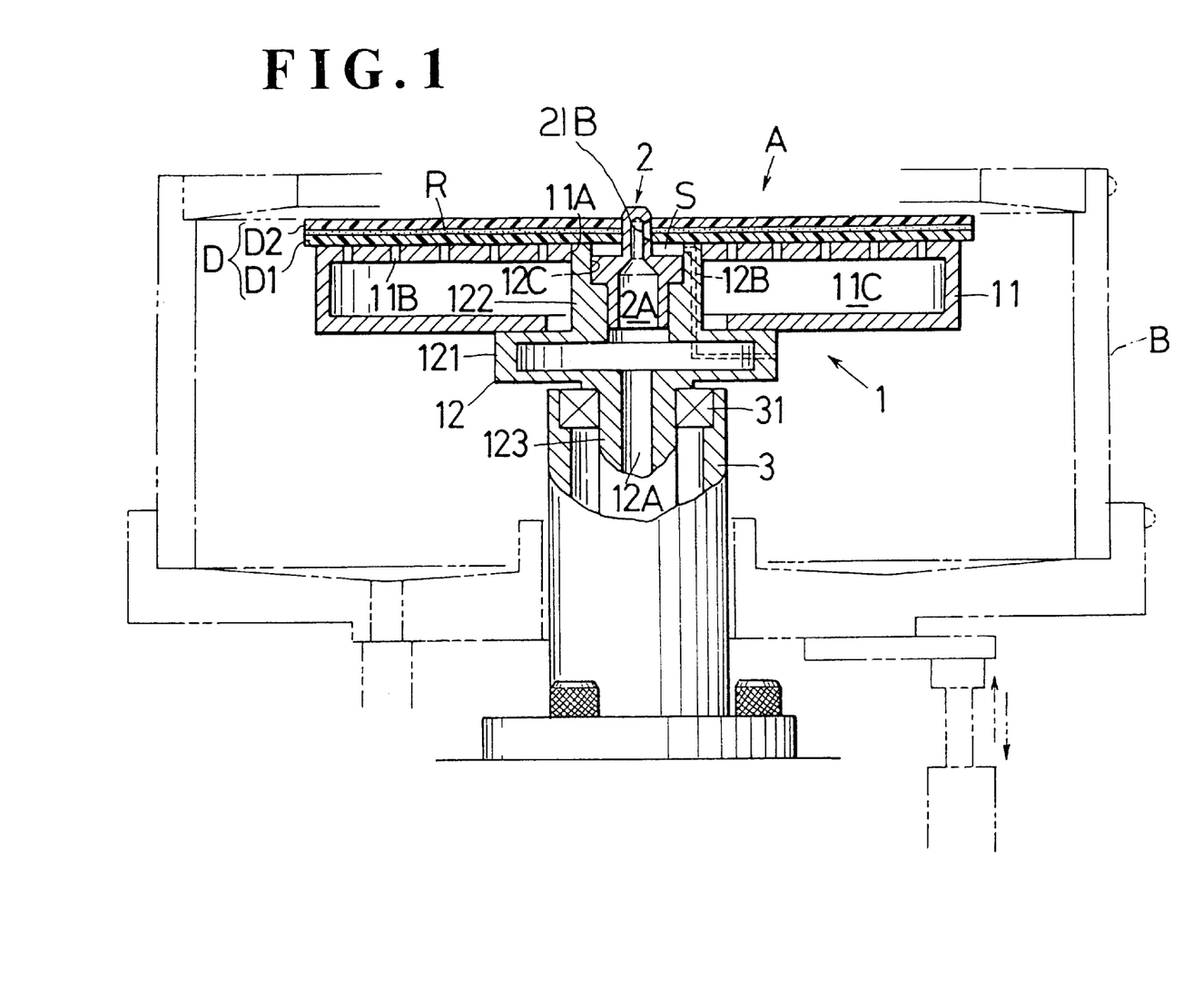
FIG. 1 is a cross sectional view showing a state where a storage disc is placed on a rotation holding table.

FIG. 1 is a cross sectional view of a state where first and second discoid resin substrates D1 and D2 are bonded to each other by way of an adhesive R and are placed on a rotation holding table A. Although a vertically movable receiving dome B is disposed around the rotation holding table A for preventing the adhesive R from being scattered when the adhesive R is developed, the receiving dome B is not relevant to the present invention, and hence the explanation of the receiving dome B is omitted.

As shown in FIG. 1, the rotation holding table A comprises a rotatable base table 1 and a boss 2 which is engaged in the base table 1. The base table 1 comprises a table 11 and a supporting portion 12, respectively described later, wherein the supporting portion 12 comprises a large diameter portion 121 for receiving the table 11, a small diameter portion 122 to be mounted on a central hole 11A of the table 11 and a most small diameter portion 123 to be inserted into a supporting sleeve 3, described later, serving as a rotary shaft.

In the base table 1, the table 11 is placed on the supporting portion 12 from the upper portion thereof and is attached thereto.

The supporting portion 12 of the base table 1 is supported by the supporting sleeve 3 having a bearing 31, and is positively rotatable by a driving source, not shown.

An insertion hole 12A is formed at the center of the supporting portion 12 and is connected to a suction source (negative pressure source), not shown, wherein a vacuum suction apparatus is employed as the negative pressure source. A recess 12C is provided in the head of the small diameter portion 122 of the supporting portion 12, and the boss 2 is engaged in and attached to the recess 12C.

Figure 2:
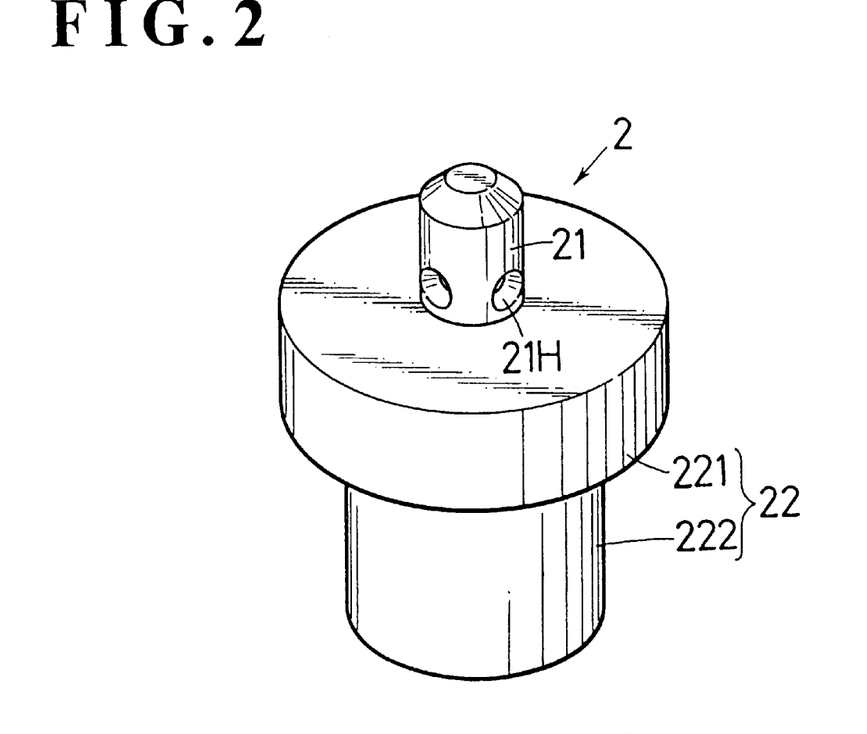
FIG. 2 is a perspective view of a boss.

FIG. 2 is a perspective view of the boss 2 in FIG. 1.

Figure 3:
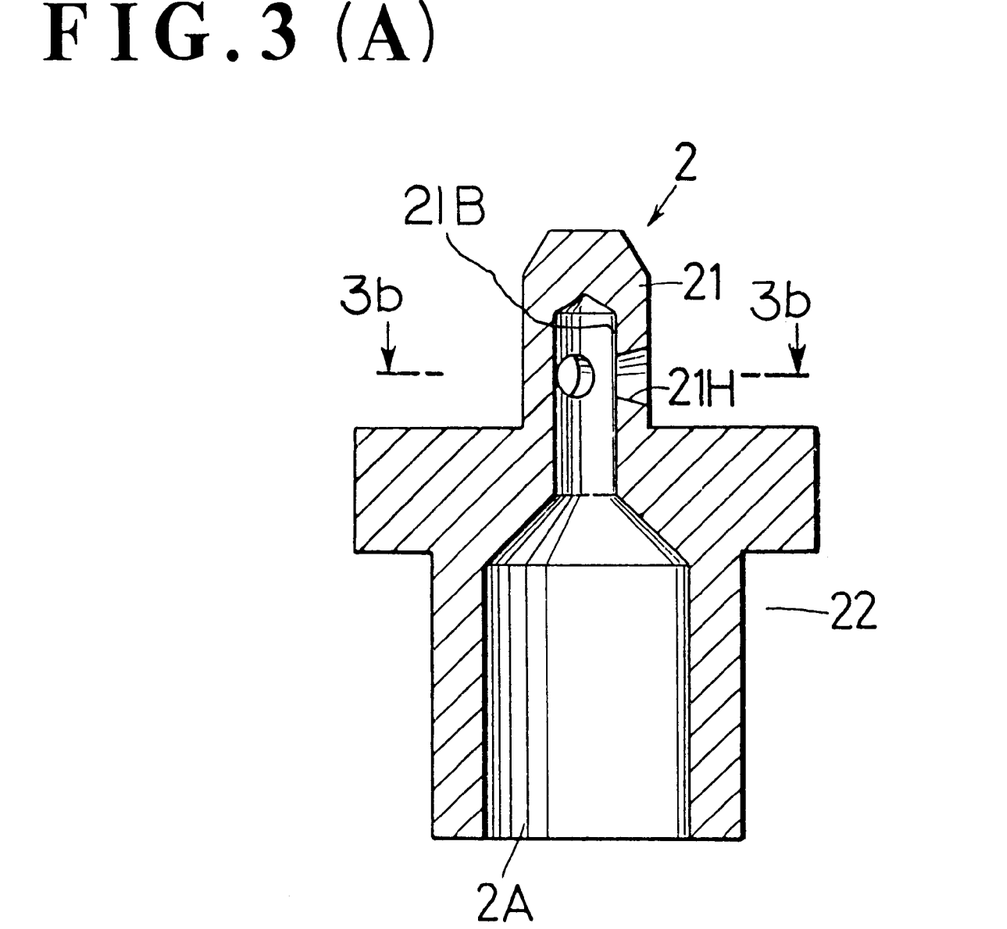
FIG. 3(A) is a cross sectional view of the boss.
FIG. 3(B) is a cross sectional view of a suction cylindrical portion.

FIG. 3(A) is a cross sectional view of the boss 2, and FIG. 3(B) is a cross sectional view taken along 3b—3b of a suction cylindrical portion 21 of the boss 2 in FIG. 3(A).

As shown in these figures, the boss 2 comprises a barrel portion 22 composed of a large diameter portion 221 and a small diameter portion 222, and the suction cylindrical portion 21 projecting from the barrel portion 22 having a suction function. The boss 2 has a suction passage including a lower passage 2A and an upper passage 21B at the central portion thereof. The lower passage 2A has a diameter greater than the upper passage 21B. A plurality of suction holes 21H are bored in the outer periphery of the boss 2, and they are opened to the suction passage 21B.

There are provided a plurality of (three in figures) suction holes 21H, and it is preferable that each of the suction holes 21H is e.g. about 1.5 mm at the maximum diameter and each shape of the suction holes 21H is enlarged outwardly. The suction cylindrical portion 21 of the boss 2 is a portion which is accurately mounted on the central hole of the storage disc.

Although the boss 2 is engaged into the base table 1, the recess 12C of the small diameter portion of the base table 1 and the large diameter portion 221 of the boss 2, and the recess 12C of the base table 1 and the small diameter portion 222 of the boss 2 are respectively designed to be brought into contact with one another, and hence there is no likelihood of leaking of the air at the contact surfaces therebetween when the adhesive is sucked.

The boss 2 engaged into the base table 1 can be integrally rotated with the base table 1. To strongly fix the base table 1, the boss 2 and the base table 1 are fastened with bolts, etc.

In the state where the storage disc D is placed on the base table 1, a space S defined between the boss 2, the base table 1 and the lower surface of the storage disc D is provided and formed in the rotation holding table A. The space S allows for introducing fresh air when performing the suction, described later.

The space S opens to the outside by a passage 12B defined in the supporting portion 12. When the boss 2 is engaged into the supporting portion 12 of the base table 1, the suction holes 21H, the suction passages 21B and 2A and the insertion hole 12A communicate with one another.

Meanwhile, the table 11 is a part on which the storage disc D is directly placed, and has a flat surface as a seating surface.

The central hole 11A is defined in the table 11 at the center thereof, and it is engaged into the supporting portion 12, and they are fixed to each other by bolts, etc., not shown, so that the table 11 is attached to the supporting portion 12. A plurality of suction holes 11B are defined in the upper surface of the table 11 so as to uniformly apply suction to and fix the storage disc D placed on the table 11. The suction holes 11B are opened to the insertion hole 12A, which is defined in the supporting portion 12, thorough a space 11C inside the table 11. When the suction source, not shown, communicating with the insertion hole 12A is operated, the suction holes 11B are negatively pressurized to perform the suction operation. At this time, the suction holes 21H, which are opened to the insertion hole 12A, are negatively pressurized so as to generate the suction force.

The force for drawing or sucking the adhesive R from the suction holes 21H is generally higher than the force for sucking and fixing the storage disc D on the seated surface of the table 11 in the minimum necessary negative pressure. Accordingly, if the force for attracting the surface of the storage disc D conforms the force for sucking the adhesive R, the storage disc D is surely fixed onto the table 11. It is needless to say that the timing between the drawing or suction time of the suction holes 21H and the suction time of the suction holes 11B can be differentiated from each other. In this case, it is preferable that the passage through which air flows is open or closed by a solenoid, etc., or the passage of the suction holes 21H and the passage of the suction holes 11B respectively independently form different passages which are connected to the suction source (negative pressure source).

Meanwhile, when the rotation holding table A is assembled, the table 11 is first engaged into the supporting portion 12 of the base table 1. Whereupon, since the supporting portion 12 appears or protrudes from the upper surface of the table 11 at the central portion thereof, the barrel portion 22 of the boss 2 is engaged into the recess 12C of the supporting portion 12, thereby easily performing the assembly of the rotation holding table A.

Then, the storage disc D is placed on the table 11 and the rotation holding table A is rotated to perform a given developing step.

In case the dimensions of the central holes of the storage discs D are differentiated to exchange the boss 2, the boss 2 is removed from the supporting portion 12 and another boss 2 having different dimensions is engaged into the supporting portion 12 in a state where the storage disc D is not placed on the table 11.

In the case where the table needs to be exchanged with another one having different dimensions depending on the kind of storage disc D, a table conforms to the storage disc D must be attached.

Figure 4:
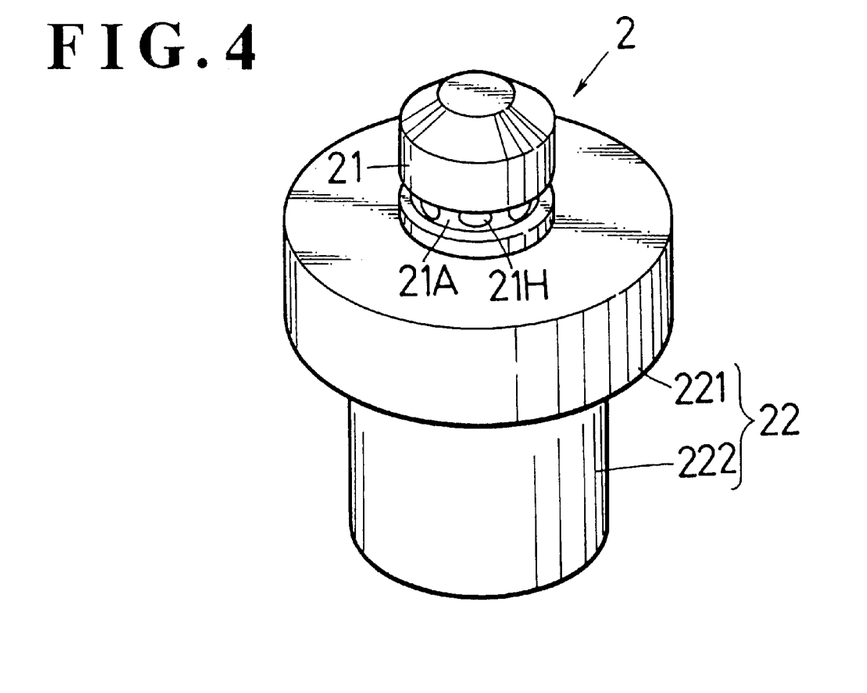
FIG. 4 is a perspective view of another boss.

FIG. 4 is a perspective view of the boss having a suction cylindrical portion 21 which is larger than the boss 2 in FIG. 2. The boss in FIG. 4 is different from the boss in FIG. 2 in that a ring groove 21A is formed on the periphery of the suction cylindrical portion 21 of the boss 2, and the suction holes 21H are bored into the bottom of the ring groove 21A.

The reason that the ring groove 21A is formed on the suction cylindrical portion 21, is to permit the suction force to uniformly act onto the entire periphery of the suction cylindrical portion 21. The suction cylindrical portion 21 normally has a width which is slightly smaller than the thickness of the storage disc D.

The reason is that when the storage disc D is placed on the rotation holding table A and rotated, there is a likelihood of the entrance of the storage disc D into the ring groove 21A owing to oscillation, etc.

Since the barrel portion 22 of the boss 2 has the same size as the boss having the small diameter showing in FIG. 2, the barrel portion 22 can be surely engaged into the recess 12C of the supporting portion 12 of the base table 1.

As explained above, when the barrel portion 22 of the boss 2 is standardized, it is very convenient to set the boss 2 having the suction cylindrical portion 21 to the recess 12C of the supporting portion 12, even if the suction cylindrical portion 21 has various diameters.

Described next is a manner of the development of the adhesive R using the rotation holding table A.

As shown in FIG. 1, the second discoid resin substrate D2 is placed on the first discoid resin substrate D1 on the rotation holding table A by way of the adhesive R, e.g., ultraviolet curing resin.

When the suction source is operated and the rotation holding table A is rotated at high speed, the adhesive R interposed between the first and second discoid resin substrates D1 and D2 is developed owing to the centrifugal force, and hence the surplus adhesive is scattered outward.

Air interposed between the first and second discoid resin substrates D1 and D2 is also discharged outward together with the surplus adhesive owing to the centrifugal force.

Since the suction source is operated, fresh air around a plurality of suction holes 21H defined in the outer periphery of the boss and the vicinity thereof is sucked sequentially through the suction holes 21H, the suction passage 21B, the suction passage 2A and the insertion hole 12A.

At the time of suction, fresh air introduced from the upper surface of the storage disc D passes through a gap defined between the upper second discoid resin substrate D2 and the boss 2, and then is sucked through the suction holes 21H, while fresh air introduced from the lower surface of the storage disc D (this fresh air is introduced from the space S by way of the passage 12B) passes through the gap defined between the lower first discoid resin substrate D1 of the storage disc D and the boss 2, and then it is sucked through the suction holes 21H.

With such a suction operation, the adhesive R interposed between the first and second discoid resin substrates D1 and D2 is sucked through the plurality of suction holes 21H, the suction passage 21B, the suction passage 2A and the insertion hole 12A.

It is a difficult manner of suction in the developing step in that the adhesive R is developed in a state where it stops at the portion immediately before the end of the central hole so as to prevent the adhesive R from being leaked outward through the central hole of the storage disc D owing to the suction operation. If the adhesive R is leaked outward through the central hole of the storage disc D, it contaminates the surface of the part, adjacent, to the central hole, which remarkably deteriorates the quality.

The degree of suction is decided carefully considering the viscosity of the adhesive R, the revolutions of the rotation holding table, etc., and it is an essential portion of the developing step.

Figure 5:
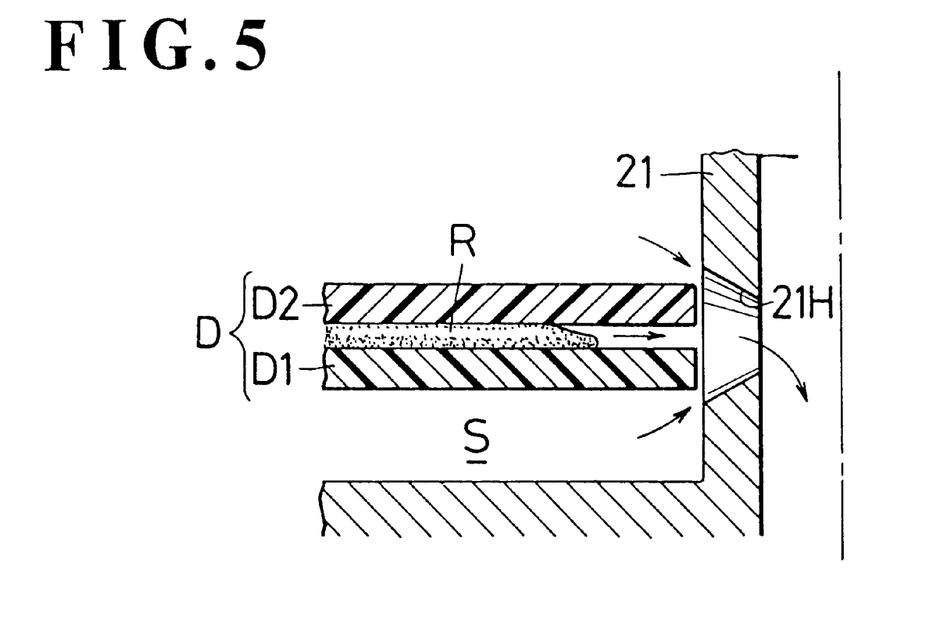
FIG. 5 is a schematic view showing a suction state.

FIG. 5 shows a schematic view showing a state where the adhesive R is uniformly developed at the part adjacent to the central holes of the first and second discoid resin substrates D1 and D2 when air is sucked through the suction port of the boss at the start of suction using the boss 2 and a part of the storage disc. When the suction is performed for a given time, the adhesive R which is present at the part adjacent to the central holes of the first and second discoid resin substrates D1 and D2 is uniformly extended.

The present invention is not limited to the aforementioned embodiment but can be variously modified without departing from the scope of the essence thereof.

For example, the adhesive to be used by the present invention is not limited to the ultraviolet curing resin as described in the embodiment of the invention but may be any kind if it can bond the first and second discoid resin substrate D1 and D2. Further, the small diameter portion 222 of the barrel portion 22 to be mounted in the insertion hole may be omitted if the large diameter portion 221 is present. Still further, although the barrel portion 22 is cylindrical in the embodiment, it may be of any shape if it can be engaged into the recess 12C of the Supporting portion 12 so as to align with the recess 12C.

There is no description of the provision of the so-called adhesive stop groove (not shown) in the optical disc according to the preferred embodiment, namely, the embodiment does not refer to the presence or non-presence of the adhesive stop groove.

In an optical disc having a standard to provide the adhesive stop groove, the suction of air through the boss is normally carried out in a manner that the development of the adhesive stops at the adhesive stop groove. However, if the adhesive is intended to overcome the adhesive stop groove so as to be sucked to the position immediately before the circumference of the central hole of the optical disc, the strength of the air suction may be changed to cope therewith.

What is claimed is:

1. A boss for being detachably mounted in a rotatable holding table for developing a storage disc comprising two discoid resin substrates having an adhesive contained in a space provided therebetween, said boss comprising a barrel portion adapted to engage in a recess formed in the rotatable holding table wherein the barrel portion has a top planar wall, a suction cylindrical portion which is in contact with and extends upwardly orthogonally from the top planar wall and has a diameter smaller than that of the top planar wall, a suction passage extending axially along the length of said boss having a first passage portion and a second passage portion, and a plurality of suction holes provided around the periphery of the suction cylindrical portion for communicating with the space provided between the discoid resin substrates, said suction holes extending radially through said suction cylindrical portion and having inner ends which open directly into said first passage portion, said first passage portion opening directly into said second passage portion, and said second passage portion having a diameter greater than said diameter of said first passage portion.

2. The boss according to claim 1, wherein the suction holes are in a valley portion of a ring groove provided on the periphery of the suction cylindrical portion.

3. The boss according to claim 2, wherein each said suction hole has an inner diameter which is enlarged outwardly.

4. The boss according to claim 1 wherein said suction cylindrical portion has a closed upper end which defines the upper extent of said first passage portion, said first passage portion having a lower end opening directly into an upper end of said second passage portion.

5. The boss according to claim 1 wherein said boss is an integral, monolithic, one-piece component.

6. A boss for being detachably mounted in a rotatable holding table for uniformly coating adhesive interposed between two disc-shaped substrates each having a central hole therein, said boss comprising:

a barrel portion configured for engagement within a recess formed in the rotatable holding table and having a planar upper surface;

a suction cylindrical portion formed integrally with said barrel portion and projecting upwardly and generally perpendicularly from said upper surface and having a diameter smaller than the diameter of said upper surface, said suction cylindrical portion defining an uppermost extent of said boss structure and being configured for insertion into the central holes of the two disc-shaped substrates;

a suction passage extending axially within said barrel portion and said suction cylindrical portion and having a closed upper end formed in said suction cylindrical portion, said suction passage having a progressively increasing diameter from said upper end thereof to a lowermost end thereof; and a plurality of suction holes extending radially within said suction cylindrical portion and having inner ends opening into said suction passage for communication therewith and outer ends opening at an outer surface thereof for drawing the adhesive between the two disc-shaped substrates into said suction passage.

7. The boss of claim 6 wherein said inner ends of said suction holes open into said suction passage at an upper portion thereof having the smallest diameter of said suction passage.

8. The boss of claim 6 wherein each said suction hole has a progressively increasing diameter from said inner end thereof to said outer end thereof.

* * * * *